United States Patent [19]
Bertram et al.

[11] 3,835,722
[45] Sept. 17, 1974

[54] QUICK DISCONNECT DEVICE FOR POWER TRAINS

[75] Inventors: August H. Bertram; Calvin L. Miller, both of Aurora, Ill.

[73] Assignee: Caterpillar Tractor Co., Peoria, Ill.

[22] Filed: Mar. 28, 1973

[21] Appl. No.: 345,791

[52] U.S. Cl. .................................. 74/405
[51] Int. Cl. ............................. F16h 57/00
[58] Field of Search ............... 74/405, 325

[56] References Cited
UNITED STATES PATENTS
2,503,146  4/1950  Anketell .......................... 74/405
2,831,362  4/1958  Truesdell ......................... 74/405
3,548,672  12/1970  Conrad ........................... 74/405

Primary Examiner—Leonard H. Gerin
Attorney, Agent, or Firm—Phillips, Moore, Weissenberger, Lempio & Strabala

[57] ABSTRACT

A power train comprises a pair of spur gears normally maintained in meshed relationship to transmit power therebetween. A piston is secured to a shaft, having one of the gears secured thereon, to selectively move the shaft axially to disengage the gears upon pressurization of an actuating chamber associated with the piston.

14 Claims, 2 Drawing Figures

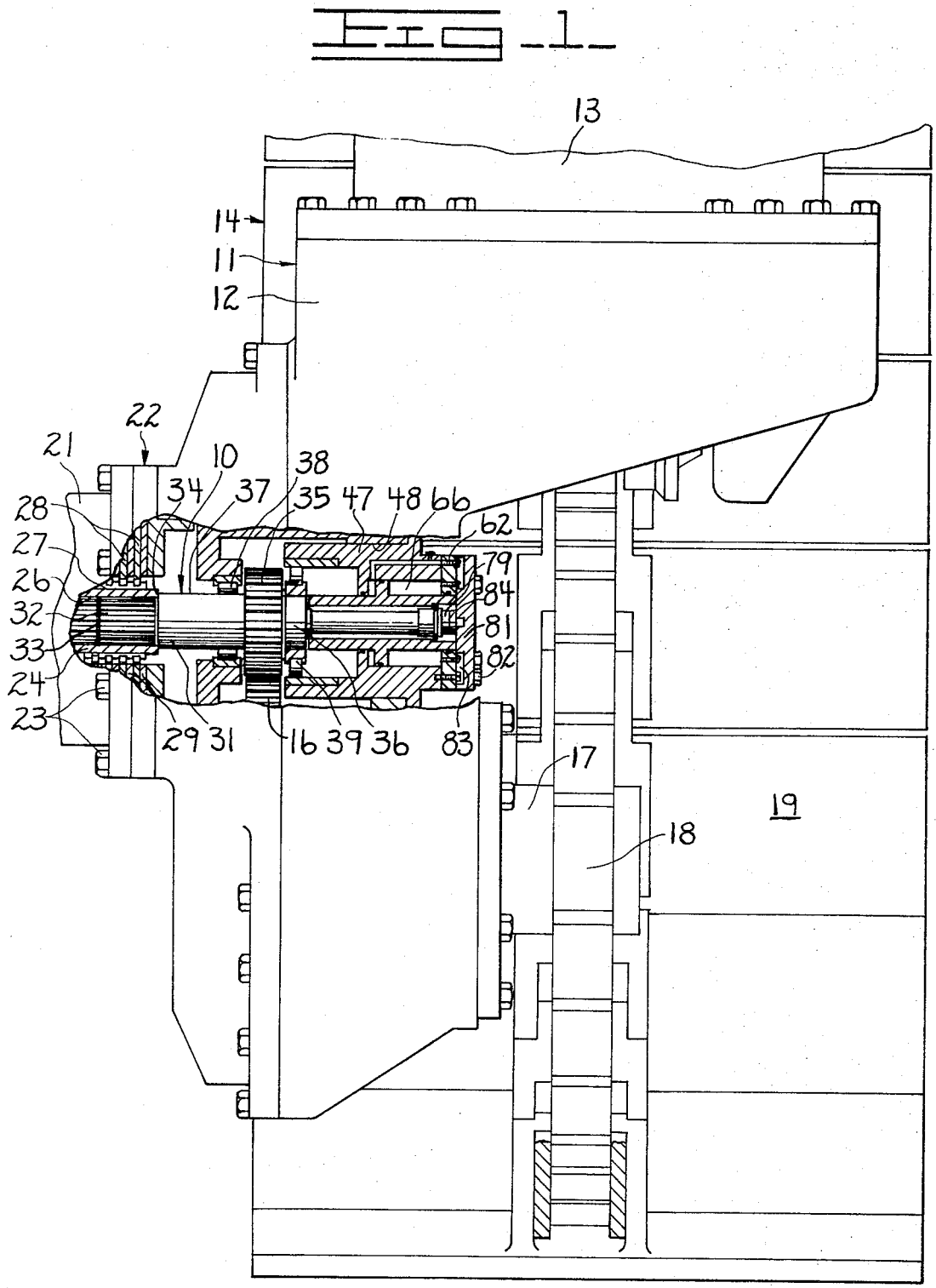

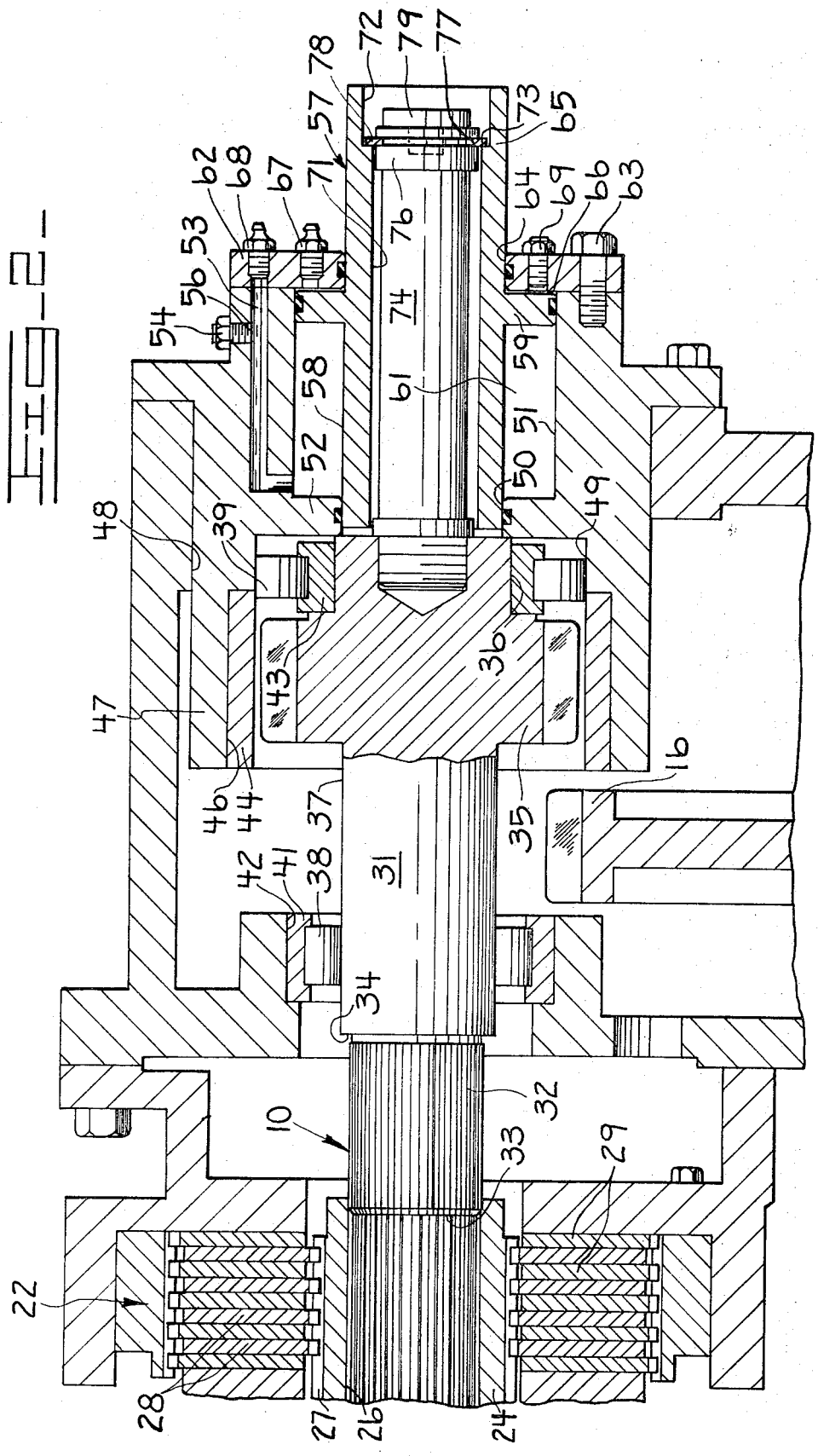

QUICK DISCONNECT DEVICE FOR POWER TRAINS

BACKGROUND OF THE INVENTION

It is oftentimes desirable to disconnect a final drive for a track-type vehicle, such as an excavator, when the vehicle is being towed. Although the transmission for the vehicle is normally placed in neutral during towing, hydrostatic motors employed in the vehicle's final drive remain operatively connected to the drive sprockets for the tracks. Thus, the motors are driven by the sprockets during towing which may result in damage thereto due to lubricant starvation and frictional drag occasioned between the rotating components thereof.

In addition, a normally engaged and hydraulically releasable brake is usually integrated into the final drive. Since the vehicle's power plant is non-operative during the towing, the brake cannot be released hydraulically unless special release mechanisms are employed therefor.

SUMMARY OF THIS INVENTION

An object of this invention is to overcome the above, briefly described problems by providing an economical and non-complex disconnect means and method for selectively disengaging rotary drive and driven members of a power train from each other. The disconnect means comprises a housing, piston means reciprocally mounted in the housing and attached to one of the members, and expansible chamber means defined by the housing and the piston for selectively receiving a pressurized medium therein to move the piston to disengage the members from each other. In the preferred embodiment of this invention, such members comprise a pair of external contact and parallel axis type spur gears.

BRIEF DESCRIPTION OF THE DRAWINGS

Other objects of this invention will become apparent from the following description and accompanying drawings wherein:

FIG. 1 is a partially sectioned, top plan view of a power train comprising a final drive for a track-type vehicle; and FIG. 2 is an enlargement of the sectioned portion, illustrated in FIG. 1.

DETAILED DESCRIPTION

FIG. 1 illustrates a disconnect device 10 operatively associated with a final drive 11 employed in a power train for a track-type vehicle. The final drive, duplicated on the opposite side of the vehicle, is disposed within a housing 12, detachably secured to a track roller frame 13 of an undercarriage 14. The final drive comprises a first spur gear or rotary driven member 16 secured to an output shaft 17 through a suitably constructed and arranged gear train (not shown).

A drive sprocket 18 is secured to an end of the output shaft to engage and move an endless track assembly 19 in a conventional manner. A hydrostatic motor 21 and a normally engaged brake assembly 22 are attached together in axial alignment on the inboard side of housing 12 by a plurality of circumferentially disposed bolts 23. Such motor and brake assembly may be of the type more fully disclosed in U.S. Pat. application Ser. No. 242,724, filed on Apr. 10, 1972 by Samuel I. Caldwell et al. for "Modular Brake Assembly" and assigned to the assignee of this application.

Referring to FIG. 2, motor 21 may be selectively actuated by hydraulic control means (not shown) to supply input power to final drive 11 upon rotation of a sleeve 24 and disconnect device 10. The sleeve is internally splined at 26 and externally splined at 27. The brake assembly, normally spring engaged and adapted to be hydraulically released as described in the above-mentioned patent application, comprises a plurality of rotatable friction discs 28 mounted for limited axial movement on external spline 27.

A plurality of non-rotatable friction discs 29 are alternately interleaved with discs 28 and cooperate therewith to hold sleeve 24 stationary when the brake is engaged. When the brake is released hydraulically, the sleeve will rotate a drive shaft 31 which has external splines 32 formed thereon. The splines extend from a first end 33 of the drive shaft and terminate at a shoulder 34.

A second spur gear or rotary driving member 35 is secured on drive shaft 31, adjacent to a second end 36 of the drive shaft, and normally meshes with first spur gear 16 in parallel axis relationship. A smooth bearing surface 37 is formed on the drive shaft, between end 33 and second spur gear 35. The drive shaft is rotatably supported on a pair of axially spaced roller bearings 38 and 39.

Bearing 38 receives bearing surface 37 of the drive shaft to permit the drive shaft to rotate as well as slide axially therein. An outer race 41 of the bearing is secured within a mating bore 42 formed in housing 12. Bearing 39 has an inner race 43 secured to end 36 of the drive shaft and a tubular outer race 44 secured within a bore 46, formed in an annular adapter 47 which extends inwardly within a bore 48 formed in the housing.

Outer race 44 is elongated to permit longitudinal movement of bearing 39 with the drive shaft. The inside diameter of the outer race is slightly larger than the outside diameter of second spur gear 35 to also permit longitudinal movement of the spur gear within the outer race. The adapter has a plurality of coaxially disposed bores 49, 50 and 51 formed therein, with bore 49 being contiguous with the inside diameter of outer race 44.

Bore 50 extends through an annular wall 52 to seal and separate bore 49 from bore 51. A passage 53 is formed in the adapter to communicate with bore 51, adjacent to annular wall 52. A vent plug 54 is threadably mounted on the adapter to normally close a port 56 communicating with passage 53.

An annular piston means 57 has a first end 58 slidably mounted in bore 50 and an annular flange 59 slidably mounted within bore 51 to define a first actuating chamber 61 between the annular flange and wall 52. A cover plate 62 is releasably attached to an end of the adapter by a plurality of circumferentially disposed bolts 63 and has a bore 64 formed centrally therethrough to slidably receive a second end 65 of the piston. Thus, a second actuating chamber 66 is defined between the cover plate and annular flange 59.

The cover plate has a pair of fill plugs 67 and 68 and a vent plug 69 threadably mounted thereon. Fill plug 67 and vent plug 69 communicate with second actuating chamber 66 whereas vent plug 54 and fill plug 68 communicate with first actuating chamber 61 via passage 53. The openable fill and vent plugs may be broadly considered to constitute "fill means" herein.

Annular piston 57 has an axial bore 71 formed therethrough. A counterbore 72 extends axially inwardly from an end of the piston and terminates at an annular shoulder 73. An elongated actuator rod 74 is coaxially disposed within bore 71 and has a first end thereof threadably attached to end 36 of the drive shaft. An opposite second end 76 of the actuator rod has a circumferential groove 77 formed thereon to seat a snapring 78 therein adapted to abut annular shoulder 73. A bearing button 79 is secured to end 76 of the actuator rod.

Referring to FIG. 1, a cover 81 is removably attached to an end of adapter 47 by a plurality of circumferentially disposed bolts 82. The cover is provided with a plurality of internal cavities 83 to accommodate fill plugs 67 and 68, vent plug 69 and bolts 63. A bearing button 84 is secured to the inner surface of cover 81 to abut bearing button 79.

During vehicle operation, drive shaft 31 is positioned as shown in FIG. 1 to continuously maintain first and second spur gears 16 and 35 in meshed relationship. Hydrostatic motor 21 functions to selectively drive the drive shaft which, in turn, drives the final drive to impart rotary motion to sprocket 18 for propelling the vehicle via endless track assembly 19. Bearing buttons 79 and 84 abut each other to maintain the drive shaft in its normal, gear engaged position.

As shown in FIG. 2, when it is desirable to tow the vehicle to a service facility, for example, drive shaft 31 is shifted to a second or disengaged position to disengage spur gear 35 from spur gear 16. Such disengagement interrupts the drive train to prevent final drive 11 from imparting rotation to input sleeve 24, brake assembly 22 and hydraulic motor 21. Such disengagement is accomplished by first removing cover 81 and then plug 69 and by thereafter directing a pressurized medium, such as grease, into fill plug 68 and chamber 61 to move piston 57 rightwardly. During such disengagement, annular shoulder 73 will engage snap ring 78 to simultaneously move piston 57, actuator rod 74 and drive shaft 31 rightwardly to disengage the teeth of the spur gears.

When it is desired to re-engage the teeth of the spur gears, vent plug 69 is reinstalled and vent plug 54 is opened. Pressurized grease is then forced into second actuating chamber 66 via fill plug 67 to thereby force piston 57 leftwardly. The left end of the piston will abut the end of the drive shaft to thereby move the drive shaft leftwardly to its FIG. 1 position to re-engage the spur gears, making certain that the teeth of the spur gears are properly aligned to prevent damage thereto. Cover 81 is then secured to adapter 47 to abut bearing buttons 79 and 84 to precisely move the drive shaft slightly further to the left into its operative position.

What is claimed is:

1. In a power train comprising a rotary driving member normally engaged with a rotary driven member to transmit power therebetween, the invention comprising disconnect means for selectively disengaging said members including a housing, piston means reciprocally mounted in said housing and attached to one of said members and expansible chamber means defined by said housing and said piston for selectively receiving a pressurized medium therein to move said piston to thus disengage said members from each other.

2. The power train of claim 1 wherein said members comprise first and second gears normally engaged in meshed relationship with each other.

3. The power train of claim 2 wherein each of said first and second gears comprises a spur gear, the axes of said spur gears disposed in parallel relationship and said piston means being aligned axially with the spur gear attached thereto.

4. The power train of claim 1 wherein one of said expansible chamber means is defined by said housing and said piston means on each axial side of said piston means for selectively disengaging and engaging said members upon alternate pressurization of said chamber means.

5. The power train of claim 4 further comprising openable fill means for selectively supplying each of said chamber means with a pressurized medium.

6. The power train of claim 5 wherein each of said fill means comprises a fill plug mounted externally on said housing and passage means for communicating a pressurized medium from said fill plug to a respective one of said chamber means.

7. The power train of claim 6 wherein each of said fill means further comprises openable vent means on said housing for selectively communicating one of said chamber means with ambient pressure upon pressurization of the other one of said chamber means.

8. The power train of claim 6 further comprising a cover plate detachably mounted on said housing to normally cover said fill plugs and an end of said piston means.

9. The power train of claim 8 further comprising positioning means mounted between said cover plate and the end of said piston means for precisely maintaining said members in engagement with each other.

10. The power train of claim 1 wherein said piston means comprises a rod threadably attached to said one member and a tubular piston detachably mounted on said rod.

11. The power train of claim 2 wherein said power train comprises a final drive of a vehicle.

12. The power train of claim 11 wherein said vehicle comprises an endless track and a sprocket drivingly engaged with said track and operatively connected in said final drive to be driven thereby.

13. The power train of claim 12 further comprising a hydrostatic motor having an output shaft and a drive shaft connected to said output shaft, said second gear secured on said drive shaft and said first gear operatively connected to said sprocket to drive same.

14. The power train of claim 13 wherein said piston means is attached to said drive shaft.

* * * * *